Aug. 27, 1929. E. P. G. WÜNSCH 1,726,463
APPARATUS FOR MEASURING THE QUANTITY OF STEAM, GAS, AIR,
WATER, OR LIKE MEDIUM FLOWING THROUGH A PIPE
Filed Feb. 29, 1924
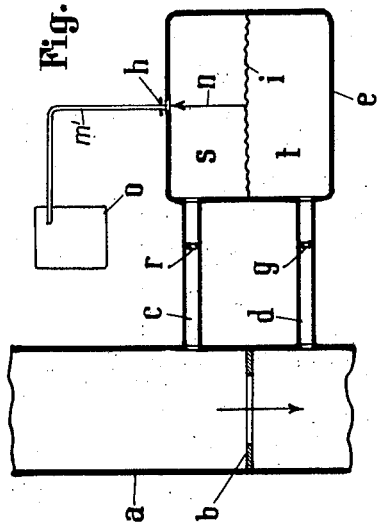
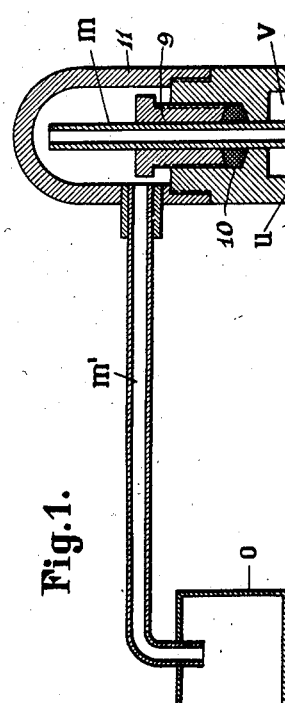
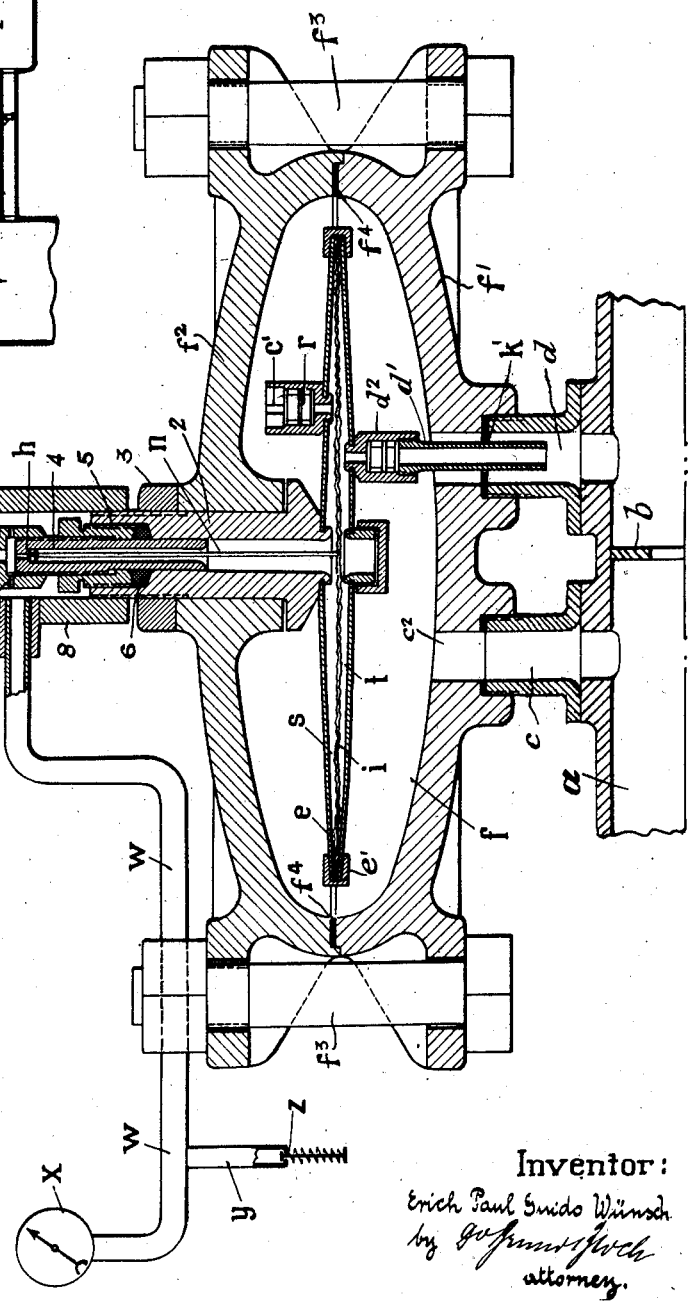
Inventor:
Erich Paul Guido Wünsch
by [signature]
attorney.

Patented Aug. 27, 1929.

1,726,463

UNITED STATES PATENT OFFICE.

ERICH PAUL GUIDO WÜNSCH, OF STEGLITZ, NEAR BERLIN, GERMANY, ASSIGNOR TO ASKANIA-WERKE AKTIENGESELLSCHAFT VORMALS CENTRALWERKSTATT DESSAU UND CARL BAMBERG-FRIEDENAU, OF BERLIN-FRIEDENAU, GERMANY.

APPARATUS FOR MEASURING THE QUANTITY OF STEAM, GAS, AIR, WATER, OR LIKE MEDIUM FLOWING THROUGH A PIPE.

Application filed February 29, 1924, Serial No. 696,104, and in Germany February 20, 1922.

This invention relates to an improved process and apparatus for measuring the quantity of steam, gas, air, water or the like flowing through a pipe. The devices hitherto used for such purposes are all very complicated in construction, and the results obtained with them do not give permanently the desired accuracy. In the present process a partial current is used which however, instead of being returned to the main pipe as hitherto usual, is conveyed into a casing where, by means of suitable devices, the same thermo-dynamic conditions are created as would exist at the point where the partial current would otherwise return to the main pipe. The quantity or volume of steam or the like passing into the said casing is measured directly or indirectly.

A construction of apparatus suitable for carrying out the aforesaid process is illustrated by way of example Figure 1 showing a section of a device according to the invention, whilst Figure 2 illustrates the invention diagrammatically.

The steam, gas, air, water or the like to be measured, flows through a pipe $a$ into which is inserted a throttling ring $b$. In front of, and behind, the said throttling ring, branch pipes $c$ and $d$ are connected to the pipe $a$ and open into a casing $e$, one on each side of a diaphragm $i$ dividing the said casing into two chambers $s$ and $t$. The chamber $s$ has an opening $h$ which can be closed by a needle valve $n$ connected to the diaphragm $i$. To the opening $h$ is connected a pipe $m'$ which leads into a measuring vessel $o$. When steam is to be measured, the vessel $o$ is a condensing vessel. In the pipe $c$ is inserted a throttling ring $r$, the ratio between the opening in the said ring and the pipe $c$ being the same as that between the opening in the throttling ring $b$ and the main pipe $a$.

The working of the device is as follows:—

Owing to the throttling ring $b$, the pressure in the pipe $a$ will be say $p'$ in front of, and $p^2$ behind, the said ring. These pressures will be transmitted through the pipes $c$ and $d$ to the chambers $s$ and $t$ respectively of the vessel $e$. As however the chamber $s$ is provided with the outlet $h$, the pressure in it will fall. The diaphragm $i$ which is affected only by the differences of the pressures $p'$ and $p^2$, will operate the valve $n$ in such a manner that the pressure in the chamber $s$ will also be $p^2$.

Through the pipe $c$ therefore a partial current will enter, the pressure of which will be $p'$ at the outlet from the main pipe $a$ and $p^2$ at the inlet into the chamber $s$, exactly as if the pipe $c$ were to open into the main pipe $a$ behind the throttling ring $b$ as is the case in the well known by-pass pipes.

Owing to the throttling disc $r$ in the pipe $c$, the quantity of steam flowing through the pipe $c$ will be proportional to that flowing through the pipe $a$. The quantity of steam passing through the pipe $c$ corresponds however to that escaping through the outlet $h$, so that the quantity flowing through the pipe $a$ can be determined exactly by the quantity measured in the vessel $o$.

When a sudden fall of pressure takes place in the pipe $a$ behind the throttling ring $b$, for instance owing to the opening of a valve of a large steam consumption plant, a sudden fall of pressure will also take place in the chamber $t$. Apart from the fact that the measurement at that instant would become incorrect, the diaphragm $i$ would be exposed to such a stress by the excess of pressure in the chamber $s$, that it would break. In order to avoid such a damage to the measuring device, a throttling ring $g$ of the same dimensions as those of the throttling ring $r$ is also inserted in the pipe $d$ so that the resistance to the flow of steam or the like through the pipe $d$ will be the same as that to the flow through the pipe $c$. Consequently, in case of a sudden change of pressure in front of, or behind, the throttling ring $b$, the pressure medium can escape from the chambers $s$ and $t$, or pass into them, only with the same speed. The chambers are therefore emptied and filled in a uniform manner, and the diaphragm cannot be exposed to serious strains; on the other hand the throttling ring $g$ does not affect the working of the device, as certain very small quantities of steam or gas will flow through the pipe $d$ only in case of changes of pressure, and the pipe $d$ is as a rule used only for producing the same static conditions of pressure in the chamber $t$ and behind the throttling ring $b$.

Instead of providing the throttling ring $g$, the pipe $d$ could be so shaped that the same resistance would be offered to the flow of the pressure medium in the pipe $d$ as to the flow through the throttling ring $r$, for instance the pipe $d$ could have its diameter reduced, or it could be made correspondingly long with a suitable number of bends, reduced portions or the like.

Figure 1 shows in section a device designed in accordance with the diagram of Figure 2 and preferably intended for measuring steam, the same reference letters being used in this case as in Figure 2.

The pipe $c$ instead of opening directly into the chamber $s$, in this construction opens into a chamber $f$ formed by the two members $f^1$ and $f^2$ held together by means of screws $f^3$ and tightened by means of the packing ring $f^4$. In the chamber $f$ is mounted the casing $e$ consisting of two comparatively thin plates held together by a U-shaped member $e^1$ and containing the diaphragm $i$. Of the two chambers $s$ and $t$ which are formed by the diaphragm $i$ in the casing $e$ the chamber $s$ is in communication with the pipe $c$ through an opening $c^2$ and a branch $c^1$ which opens into the chamber $f$. This branch $c^1$ contains the throttling ring $r$. The chamber $t$ is connected directly to the steam pipe $d$ by the pipes $d^1$ and $d^2$ screwed together. The pipe $d^1$ dips into the pipe $d$ and projects over a disc $k^1$ held between the pipe $d$ and the member $f^1$. Between the chamber $f$ and the pipe $d$ there is a leak $k$, so that a very small quantity of steam can always pass into the pipe $d$, the pressure in which is lower than that in the chamber $f$.

The object of this arrangement is to keep the pressure around, as well as the temperature of, the whole of the casing $e$, the same as those obtained in the interior of the casing $e$. Owing to the balancing of pressure, the casing $e$ can be made of a comparatively thin material and consequently becomes a good conductor of heat, so that the steam actually passing into the chambers $s$ and $t$ has the same temperature as that of the steam in the main pipe $a$, and no condensation takes place in the said chambers. The steam escaping through the valve $h$, $n$ is carried away through a pipe $m$ and passes through the pipe $m'$ into the condensing vessel $o$ where the quantity of steam is measured.

The casing $e$ is carried by a sleeve 2 inserted into the member $f^2$ and retained therein by a nut 3. The valve body 4 extends into the sleeve 2; it is screwed into a box 5 inserted in turn into said sleeve 2, there being, however, a packing ring 6 placed between the two boxes. The valve body 4 carries the seat for the valve $n$, and onto it is screwed the tube $m$ which is provided at its lower end that rests upon the valve-body 4 with a head 7, as well as with fine bores $u$ which terminate into a space $v$ formed in a body 8. This body is screwed upon the sleeve 2, and tightened at its upper end by means of a stuffing box 9 with the aid of a packing ring 10. The stuffing box encompasses the tube $m$. Upon the body 8 is put a hood 11 into which the tube terminates.

Owing to the arrangement described the steam issuing from the valve $h$ acts in the manner of an injector; it can then be used for measuring the steam consumption in every moment, additionally to the entire gas- and steam-amount. The steam jet entering the pipe $m$, draws air laterally through holes $u$ from a chamber $v$ and carries the same with it. The chamber $v$ is connected by a pipe $w$ to a pressure gauge $x$. As the depression produced by the escaping steam jet in the chamber $v$, and accordingly also in the pipe $w$, is proportional to the escaping quantity of steam, the gauge $x$ will also always indicate the instantaneous steam consumption or, when it is a question of measuring a gas current, the instantaneous gas consumption.

In order to avoid condensation of steam in the pipe $w$ and the consequent inaccuracies in the measuring, the said pipe is provided with a branch pipe $y$ which is connected through a relatively large resistance $z$, for instance a throttling ring with a very small area of passage, to the atmospheric air. Accordingly, air is constantly being drawn through the resistance $z$ and the pipe $y$ into the chamber $v$, so that any products of condensation or any steam contained in the pipe, are carried away by the said air current. The resistance $z$ must be of course so great that the leak due to it in the pipe $w$ will affect only to an inconsiderable extent the accuracy of measurement of the gauge $x$.

In place of the aforesaid injector-like device, any other device for measuring the instantaneous energy of flow of the partial current could be used.

Having now particularly described and ascertained the nature of my said invention and in what manner the same is to be performed, I declare that what I claim is:—

1. An apparatus for measuring the quantity of steam, gas, air, water or a like medium flowing through a pipe, containing in combination a main pipe through which the medium to be measured is flowing, a casing, a flexible member dividing said casing into two chambers, a jacket fully surrounding said casing, there being an opening provided within the wall of the casing and connecting the one of said chambers with the interior of the jacket, a resistance within said pipe, means connecting the other chamber with the pipe at the one side of said resistance and means connecting said jacket with the pipe at the other side of said resistance.

2. An apparatus for measuring the quantity of steam, gas, air, water or a like medium flowing through a pipe, containing in combination a main pipe through which the medium to be measured is flowing, a casing, a flexible member dividing said casing into two chambers, a jacket fully surrounding said casing, there being an opening provided within the wall of the casing and connecting the one of said chambers with the interior of the jacket, a resistance within said pipe, means connecting the other chamber with the pipe at the one side of said resistance, means connecting said jacket with the pipe at the other side of said resistance and a fine passage provided in the first named means connecting said jacket also with the pipe.

3. An apparatus for measuring the quantity of steam, gas, air, water or a like medium flowing through a pipe, containing in combination a main pipe through which the medium to be measured is flowing, a casing, consisting of a relatively thin metal, a flexible member dividing said casing into two chambers, a jacket fully surrounding said casing, there being an opening provided within the wall of the casing and connecting the one of said chambers with the interior of the jacket, a resistance within said pipe, means connecting the other chamber with the pipe at the one side of said resistance and means connecting said jacket with the pipe at the other side of said resistance.

4. In an apparatus for measuring the quantity of steam, gas, air, water or a like medium flowing through a pipe, in combination a main pipe through which the medium to be measured is flowing, a resistance within said main pipe creating therein a difference of pressure, a casing, a flexible member dividing said casing into two chambers, there being an exit in the one chamber, means regulated by said flexible member for controlling the flow thru the casing an exit means connecting said chamber with the main pipe at a point before said resistance and conveying a partial current of the medium to be measured into said casing, a resistance within said means, the ratio between said last mentioned resistance and the said means being the same as that between the resistance within the main pipe and said main pipe, a second means connecting the other chamber of the casing with the main pipe at a point behind the first mentioned resistance, a jacket filled with the medium to be measured and surrounding said casing, being in open communication with the first mentioned means conveying the said partial current but communicating with the last mentioned means only by a very fine passage, for the purpose set forth, and means adapted to measure the volume or quantity of the medium passing through said casing.

5. In an apparatus for measuring the quantity of steam, gas, air, water or a like medium flowing through a pipe, in combination a main pipe through which the medium to be measured is flowing, a casing, a flexible member dividing said casing into two chambers, there being an exit in the one chamber, means regulated by said flexible member for controlling the flow thru the casing, an exit means connecting said chamber with the main pipe and conveying a partial current of the medium to be measured into said casing, means adapted to create in said casing the same thermodynamic conditions as would exist at the point where the partial current woud otherwise return to the main pipe, said casing being made of a relatively thin metal, a jacket filled with the medium to be measured and surrounding said casing and means adapted to measure the volume or quantity of the medium passing into said casing.

6. An apparatus for measuring the quantity of steam, gas, air, water or a like medium flowing through a pipe, containing in combination a main pipe through which the medium to be measured is flowing, a casing, a flexible member dividing said casing into two chambers, there being an exit in the one chamber, means regulated by said flexible member for controlling the flow thru the casing, an exit means connecting said chamber with the main pipe and conveying a partial current of the medium to be measured into said casing, means adapted to create in said casing the same thermodynamic conditions as would exist at the point where the partial current would otherwise return to the main pipe, means adapted to measure the volume or quantity of the medium passing into said casing and an injectorlike device, through which the partial current passes thereby producing a drop in pressure and means for measuring the value of said drop in pressure.

7. An apparatus for measuring the quantity of steam, gas, air, water or a like medium flowing through a pipe, containing in combination a main pipe through which the medium to be measured is flowing, a casing, a flexible member dividing said casing into two chambers, there being an exit in the one chamber, means regulated by said flexible member for controlling the flow thru the casing, an exit means connecting said chamber with the main pipe and conveying a partial current of the medium to be measured into said casing, means adapted to create in said casing the same thermodynamic conditions as would exist at the point where the partial current would otherwise return to the main pipe, means adapted to measure the volume or quantity of the medium passing into said casing, an injector-like device, through which the partial current passes thereby producing a drop in pressure in the space surrounding it, means for measuring the value of said drop in pressure and means connecting said space with the measuring device and containing a small leak leading into the atmosphere.

In testimony whereof I have affixed my signature.

ERICH PAUL GUIDO WÜNSCH.